United States Patent
Wang

(10) Patent No.: US 11,773,288 B2
(45) Date of Patent: Oct. 3, 2023

(54) MODIFIED POLYAMIC ACID, PREPARATION METHOD THEREOF, AND PREPARATION METHOD OF COMPOSITE FILM

(71) Applicant: Wuhan China Star Optoelectronics Semiconductor Display Technology Co., LTD., Hubei (CN)

(72) Inventor: Yamin Wang, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 546 days.

(21) Appl. No.: 16/615,374

(22) PCT Filed: Nov. 7, 2019

(86) PCT No.: PCT/CN2019/116127
§ 371 (c)(1),
(2) Date: Nov. 20, 2019

(87) PCT Pub. No.: WO2020/238029
PCT Pub. Date: Dec. 3, 2020

(65) Prior Publication Data
US 2021/0355349 A1   Nov. 18, 2021

(30) Foreign Application Priority Data
May 27, 2019  (CN) .......................... 201910445906.7

(51) Int. Cl.
C09D 179/08    (2006.01)
B05D 3/02      (2006.01)
(Continued)

(52) U.S. Cl.
CPC ......... *C09D 179/08* (2013.01); *B05D 3/0272* (2013.01); *B05D 3/108* (2013.01); *C09D 127/16* (2013.01); *G02F 1/133723* (2013.01)

(58) Field of Classification Search
CPC .. C09D 179/08; C09D 127/16; B05D 3/0272; B05D 3/108; G02F 1/133723
See application file for complete search history.

(56) References Cited

U.S. PATENT DOCUMENTS

2015/0307709 A1   10/2015   Lai et al.

FOREIGN PATENT DOCUMENTS

| CN | 101192665 A | 6/2008 |
| CN | 103755918 A | 4/2014 |

(Continued)

OTHER PUBLICATIONS

English Machine Translation of KR10-1284397.*
(Continued)

*Primary Examiner* — Robert S Walters, Jr.
(74) *Attorney, Agent, or Firm* — PV IP PC; Wei Te Chung; Zhigang Ma

(57) ABSTRACT

A modified polyamic acid, a preparation method thereof, and a preparation method of a composite film are provided. The modified polyamic acid includes polyamic acid and polyvinylidene fluoride. The modified polyamic acid is formed by introducing polyvinylidene fluoride having good thermal stability, high dielectric constant, excellent piezoelectric, and ferroelectric properties, so the dielectric constant and structural adjustability of the modified polyamic acid are improved.

7 Claims, 2 Drawing Sheets

(51) Int. Cl.
 *B05D 3/10* (2006.01)
 *C09D 127/16* (2006.01)
 *G02F 1/1337* (2006.01)

(56) References Cited

FOREIGN PATENT DOCUMENTS

| CN | 103958188 A | 7/2014 | | |
|---|---|---|---|---|
| CN | 104017364 A | 9/2014 | | |
| CN | 104830058 A | 8/2015 | | |
| CN | 107286650 A | 10/2017 | | |
| CN | 108586741 A | 9/2018 | | |
| CN | 110093034 A | 8/2019 | | |
| EP | 1221732 A2 | * | 7/2002 | ............ C09J 179/08 |
| JP | S62150325 A | 7/1987 | | |
| JP | 2004161821 A | 6/2004 | | |
| KR | 101284397 B1 | * | 7/2013 | |
| WO | 2019099329 A1 | 5/2019 | | |

OTHER PUBLICATIONS

Moon et al. "Preparation and Characterization of Transparent Polyimide-Silica Composite Films Using Polyimide with Carboxylic Acid Groups" Polymers 2019, 11, 4289, pp. 1-10, published Mar. 2019.*
Jia et al. "Synthesis and properties of novel electroactive poly(amic acid) and polyimide copolymers bearing pendant oligoaniline groups" Polym. Chem., 2011, 2, 1300.*
"Preparation and Properties of Polyimide/Polyvinylidene Fluoride Functional Membrane", China Academic Journal Electronic Publishing House, Issue 07, vol. 01, 2018.

* cited by examiner

MODIFIED POLYAMIC ACID, PREPARATION METHOD THEREOF, AND PREPARATION METHOD OF COMPOSITE FILM

BACKGROUND OF INVENTION

Field of Invention

The present invention relates to a field of display panel substrate materials, and more particularly, to a modified polyamic acid, a preparation method thereof, and a preparation method of a composite film.

Description of Prior Art

Generally, a polyimide (PI) film is made of polyimide, and the polyimide refers to a high heat resistant resin. An aromatic dianhydride and an aromatic diamine or an aromatic diisocyanate are polymerized to obtain a polyamic acid derivative, which is then dehydrated and imidized by a ring-closing reaction at a high temperature to obtain the resin.

The aromatic dianhydride used for preparing the polyimide includes pyromellitic dianhydride (PMDA) or biphenyltetracarboxylic dianhydride (BPDA), etc. An aromatic diamine used for the polyimide includes Diaminodiphenyl ether (ODA), p-phenylenediamine (p-PDA), m-phenylenediamine (m-PDA), Methylenedianiline (MDA), diaminophenyl hexafluoropropane (HFDA), etc.

The polyimide refers to a type of polymer containing an imide ring in the main chain, which is an insoluble and infusible ultra-high heat resistant resin, and it also has excellent thermal oxidation stability, heat resistance, radiation resistance, low temperature, and chemical resistance, so it may be used as heat-resistant material, which is widely applied to automobiles, aerospace, spacecraft, etc. Also, the polyimide may be used as electronic material, which is widely applied to insulating coatings, insulating films, semiconductors, electrode protective films for thin film transistor liquid crystal displays (TFT-LCDs), etc.

Currently, flexible printed circuit boards, liquid crystal displays, and photovoltaic cells are well developed. The application in flexible printed circuit boards, liquid crystal displays, and photovoltaic cells also require new polyimide films having excellent physical and chemical properties. For example, (1) extremely low dielectric constant to avoid dielectric loss causing power consumption, (2) very low coefficient of thermal expansion (CET) to avoid peeling of the polyimide film from the substrate due to expansion or contraction when the temperature changes, (3) very low hygroscopicity to avoid moisture absorption adversely affecting the electrical performance of electrical devices.

Conventional polyimide materials often have denser rigid structures and strong intermolecular interactions, but pure polyimide is rarely used for applying because it is difficult to achieve comprehensive performance standards, such as the pure polyimide has a low dielectric constant of 1.7 to 2.0, which limits its application. For example, in the fields of storage and display, the polyimide needs to have high dielectric constant and low dielectric loss properties so as to achieve high storage capacity and excellent flexibility. At the same time, the polyimide has strong structural adjustability, so the preparation of reinforced composite polyimide has become an increasingly important concern in the field of application.

SUMMARY OF INVENTION

A modified polyamic acid, a preparation method thereof, and a preparation method of the composite film are provided to solve the problems such as low dielectric constant of the polyimide material, high dielectric loss, and poor flexibility of the composite film prepared by the polyimide material.

In one embodiment, a modified polyamic acid includes 40%-95% by mass of polyamic acid and 5%-60% by mass of polyvinylidene fluoride.

In another embodiment, a preparation method of a modified polyamic acid includes providing polyvinylidene fluoride, mixing the polyvinylidene fluoride and the polyamic acid to obtain a modified polyamic acid, and the modified polyamic acid comprises 40%-95% by mass of the polyamic acid and 5%-60% by mass of the polyvinylidene fluoride.

In one embodiment, before providing the polyvinylidene fluoride, the method further includes dissolving a first compound and a second compound using a dissolving agent, mixing a dissolved first compound and a dissolved second compound in a reaction vessel, and the dissolved first compound and the dissolved second compound are sufficiently reacted to obtain a reaction solution, and the first compound terminated with one amine on either end and the second compound includes a dianhydride group; and filtering the reaction solution in a vacuum environment to obtain the polyamic acid.

In one embodiment, a molar ratio of the first compound to the second compound ranges from 1:0.7 to 1:1.

In one embodiment, the first compound is prepared by a condensation reaction of aniline and functionalized benzoic acid.

In one embodiment, the second compound includes one of the following structure formulas:

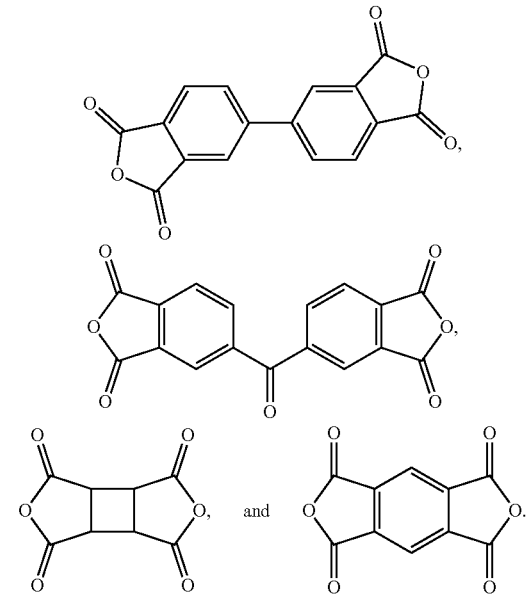

In one embodiment, the dissolving agent is a mixture of N,N-dimethylhexanamide and N-methylpyrrolidone, and a volume ratio of the N,N-dimethylhexanamide to the N-methylpyrrolidone ranges from 1:0.5 to 1:5.

In one embodiment, a mixing step of the polyvinylidene fluoride and the polyamic acid includes dissolving the polyvinylidene fluoride using a dissolving agent and mixing a dissolved polyvinylidene fluoride and the polyamic acid through a mechanical blending method to obtain the modified polyamic acid.

In further embodiment, a preparation method of a composite film includes providing the modified polyamic acid, coating the modified polyamic acid, drying, and crosslinking curing a coated modified polyamic acid to obtain the composite film.

In another embodiment, a display device includes a substrate, and the substrate includes the modified polyamic acid.

The modified polyamic acid is formed by introducing polyvinylidene fluoride having good thermal stability, high dielectric constant, excellent piezoelectric, and ferroelectric properties, so the dielectric constant and structural adjustability of the modified polyamic acid are improved. Meanwhile, the processes of the preparation method of the modified polyamic acid are simple and easy to operate. Also, the composite film made of the modified polyimide has high storage capacity and excellent flexibility.

BRIEF DESCRIPTION OF DRAWINGS

In order to more clearly illustrate the technical solutions in the embodiments of the present invention, the drawings used in the description of the embodiments will be briefly described below. It is obvious that the drawings in the following description are only some embodiments of the present invention. Other drawings can also be obtained from those skilled persons in the art based on these drawings without paying any creative effort.

DETAILED DESCRIPTION OF PREFERRED EMBODIMENTS

Figure 1:
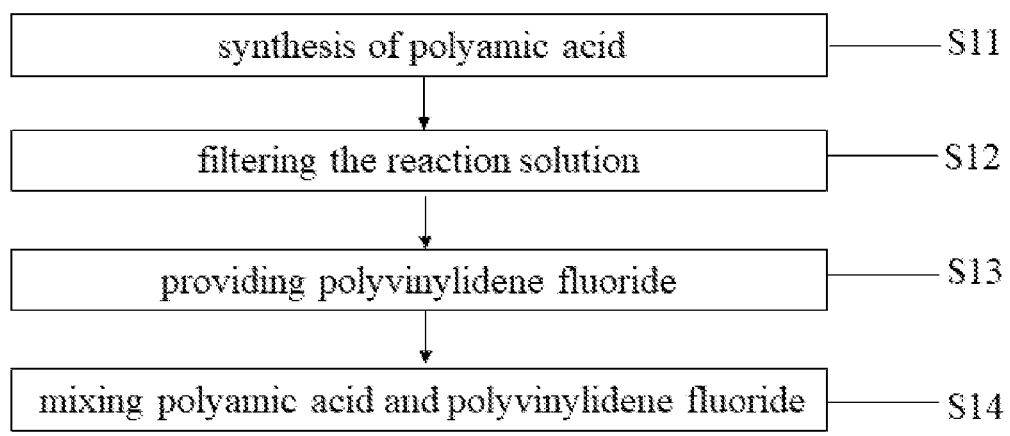
FIG. 1 is a process flow diagram showing preparation method of a modified polyamic acid according to one embodiment of the present invention.

The preferred embodiments of the present invention are described in detail below with reference to the accompanying drawings. Those skilled persons in the art can understand how to implement the invention. However, the present invention may be achieved in many different ways and embodiments, and the scope of the invention is not limited to the embodiments described herein.

The terms "first," "second," "third," etc. (if present) in the specification and claims of the present invention and the drawings are used to distinguish similar objects and are not necessarily used to describe a particular order. It should be understood that the objects are interchangeable at an appropriate time.

The terminology used in the description describes specific embodiments. Expressions used in the singular include the plural forms of expression unless the context clearly dictates otherwise. In the description, it is to be understood that the terms such as "comprise," "include," and "encompass" interpret the possibility of one or more other features, numbers, steps, actions, or combinations thereof.

If the context has clear opposite indications, the steps of all methods described herein can be performed in any suitable order. The changes of the present invention are not limited to the order of steps. The use of any and all examples or exemplary language clearly describes the present invention, and numerous modifications and adaptations will be apparent to those skilled persons in the art without departing from the scope of the invention.

In one embodiment, a modified polyamic acid includes a 10% by mass of polyamic acid and 90% by mass of polyvinylidene fluoride. The polyvinylidene fluoride has a structure formula as follows:

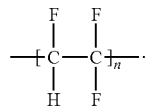

In another embodiment, a preparation method of a modified polyamic acid includes steps described as follows.

Step S11, synthesis of polyamic acid: adding a first compound and a dissolving agent to a reaction vessel, and the reaction vessel is transferred to a mechanical stirrer, and the mechanical stirrer begins to stir. Then, a second compound is dissolved in the same dissolving agent and added dropwise to the reaction vessel. Next, the first compound and the second compound are mixed, and a mixed solution is stirred at room temperature for 24 hours to 96 hours, and the mixed solution is sufficiently dissolved and reacted to obtain a reaction solution having the polyamic acid.

The first compound terminated with one amine on either end and the second compound includes a dianhydride group. A molar ratio of the first compound to the second compound ranges from 1:0.7 to 1:1. The second compound includes one of the following structure formulas:

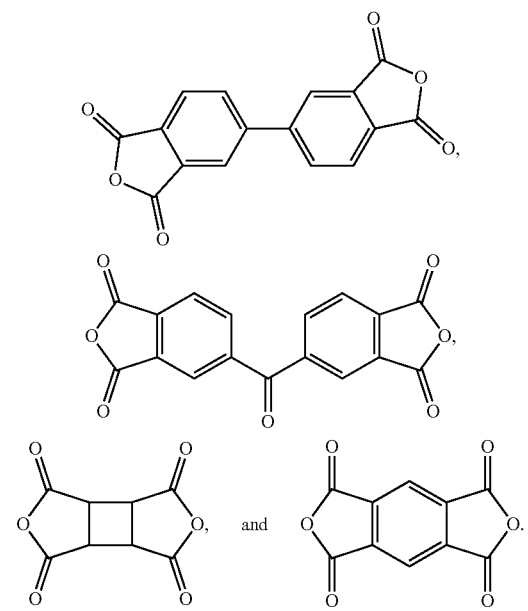

In the embodiment, the first compound is prepared by a condensation reaction of active aniline and functionalized benzoic acid. The first compound has a structure formula as follows:

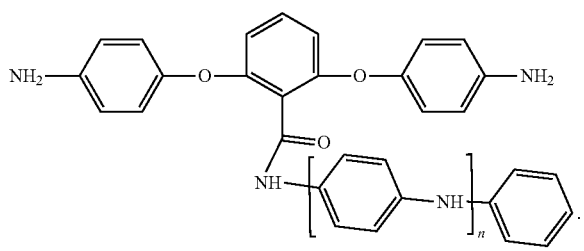

A common feature of the compounds is that using the aniline to form polymeric aniline, and functionalized benzoic acid is used as a blocking reagent to prepare aniline terminated diamine groups. Because aniline has an excellent electrochemical reversibility, the amines on both ends of the first compound are electrically active.

In the embodiment, the second compound is 1,2,4,5-cyclohexanetetracarboxylic dianhydride, which has a structure formula as follows:

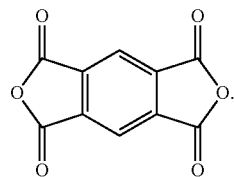

The preparation process in the step S11 is shown in formula 1:

until no bubbles are visible to the naked eye. Finally, the resulting solution has the desired polyamic acid.

Step S13, providing polyvinylidene fluoride: polyvinylidene fluoride is weighed and then dissolved by using a dissolving agent, and the dissolved solution concentration is 1 mmol/L. The polyvinylidene fluoride has a good thermal stability and can be modified by carboxylic acid and alcohol polymers because of its high dielectric constant and excellent piezoelectric and ferroelectric properties. The purpose of introducing the polyvinylidene fluoride is to introduce the fluorine atom, which is the most electronegative element, thereby increasing the dielectric constant of the polyamic acid.

Step S14, mixing polyamic acid and polyvinylidene fluoride: firstly, the dissolved polyvinylidene fluoride solution and the polyamic acid solution obtained in the step S12 are respectively weighed according to the mass ratio, and the polyamic acid is 40%-95% by mass and the polyvinylidene fluoride is 5%-60% by mass. Then, polyvinylidene fluoride solution is added to the polyamic acid solution, and a mixed solution is stirred for 5 hours to 9 hours to obtain a polyamic acid/polyvinylidene fluoride mixed solution. The polyamic acid/polyvinylidene fluoride mixed solution has a modified polyamic acid.

In the embodiment, the dissolving agent is a mixture of N,N-dimethylhexanamide and N-methylpyrrolidone, and a volume ratio of the N,N-dimethylhexanamide to the N-methylpyrrolidone ranges from 1:0.5 to 1:5.

Figure 2:
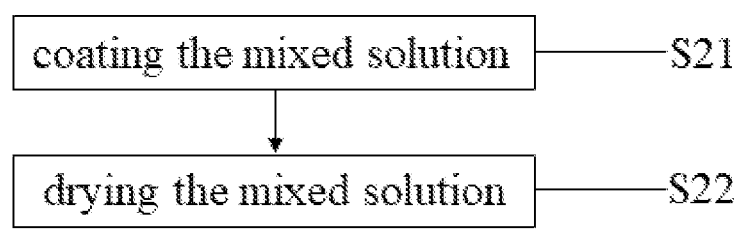
FIG. 2 is a process flow diagram showing a flow cha of preparing a composite film layer in an embodiment of the present invention.

In another embodiment, a preparation method of a composite film is provided. The composite film is made of polyimide and polyvinylidene fluoride. The preparation process is shown in FIG. 2, and the preparation steps are described as follows:

formula 1

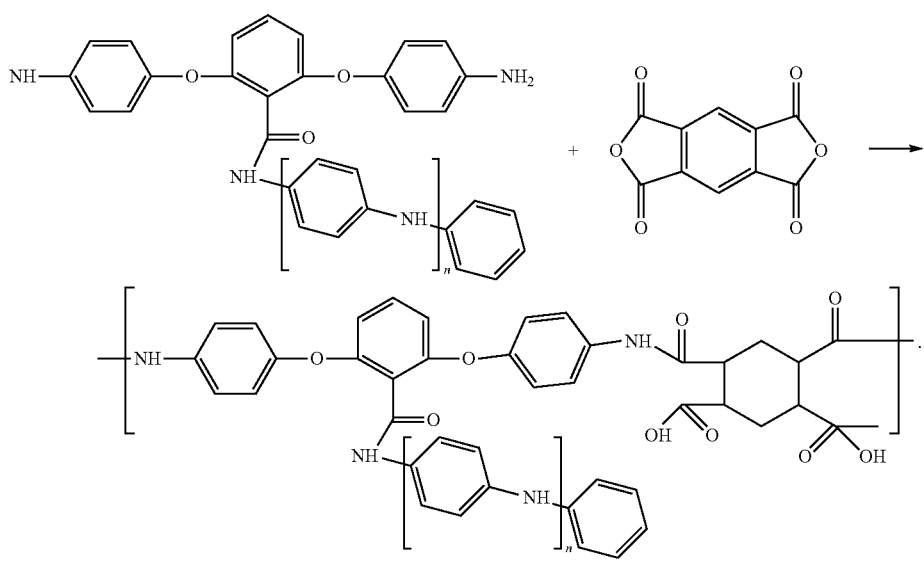

Step S12, filtering the reaction solution: after the stirring is completed, the mechanical stirrer is removed. The reaction vessel is placed in a vacuum environment for suction filtration, and a solution obtained by suction filtration is evacuated by a vacuum pump for 1 hour to remove bubbles in the reaction solution. Then, the evacuated reaction solution is placed at room temperature for 2 hours to 4 hours, so that the bubbles in the reaction solution are further reduced Step S21, coating the mixed solution: providing a substrate and uniformly coating the modified polyamic acid/polyvinylidene fluoride solution obtained from the preparation method of the modified polyamic acid on the substrate.

Step S22, drying the mixed solution: the substrate coated with the modified polyamic acid/polyvinylidene fluoride solution is placed in a dryer, and the dryer is used for drying a flexible film, and then the substrate coated with the modified polyamic acid/polyvinylidene fluoride solution is baked at a temperature of 1° C. to 500° C. Then, the modified polyamic acid/polyvinylidene fluoride mixed solution coating on the substrate is dried and crosslinking cured to obtain the composite film layer.

In another embodiment, a display device includes a substrate, and the substrate is made of the modified polyamic acid provided in the embodiment of the present invention. The substrate is a polyimide/polyvinylidene fluoride composite film obtained from the preparation method of a composite film provided in the embodiment of the present invention.

Figure 3:
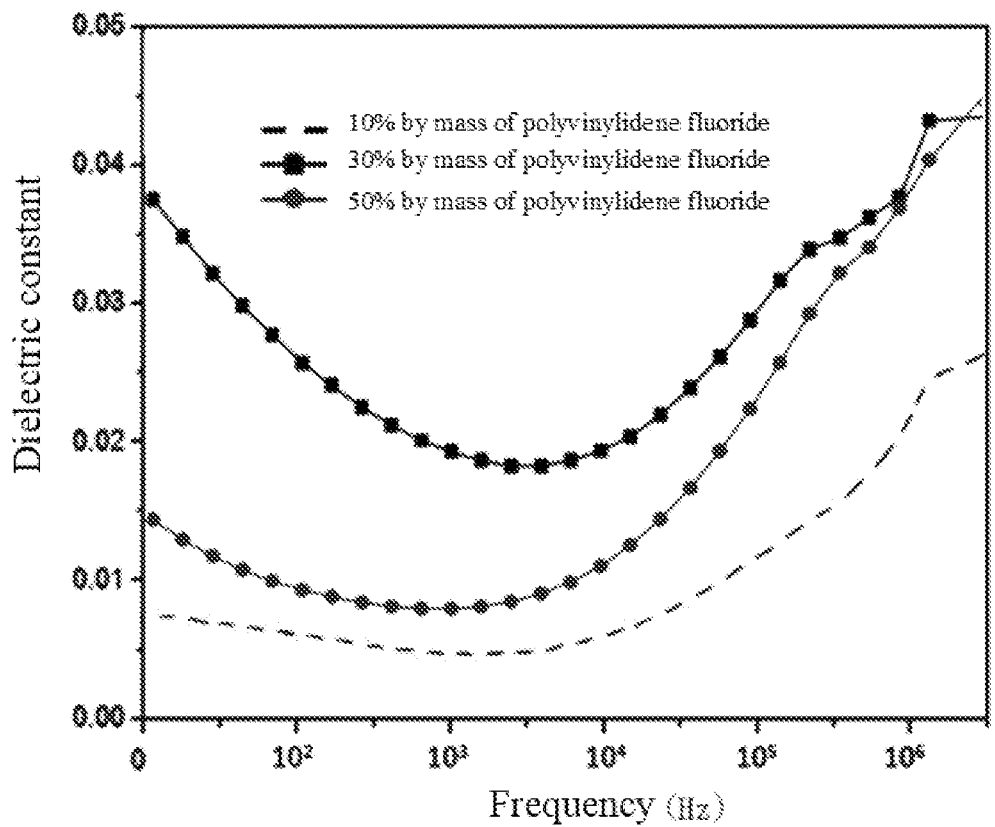
FIG. 3 is a schematic view of the relationship between dielectric loss and frequency variation of a composite film having different polyvinylidene fluoride mass according to one embodiment of the present invention.

As shown in FIG. 3, the dielectric constants of the polyimide/polyvinylidene fluoride composite film layers respectively having 10%, 30%, and 50% by mass of polyvinylidene fluoride are characterized. At a frequency of 50 Hz, the dielectric constants of polyimide/polyvinylidene fluoride composite film layers having 10%, 30%, and 50% by mass of polyvinylidene fluoride are 4.5, 5.3, and 4.6, respectively, which are more than two to three times of common pure polyimide. It proves that adding the polyvinylidene fluoride can significantly improve the dielectric properties of the material, and it also shows that good C—F—C bonds are formed between polyimide and polyvinylidene fluoride. However, when the content of polyvinylidene fluoride exceeds 30% by mass, excess of polyvinylidene fluoride is aggregated on the surface of the polyimide, thereby suppressing the polarization of the polyimide and decreasing the dielectric constant of the composite film.

The modified polyamic acid is formed by introducing polyvinylidene fluoride having good thermal stability, high dielectric constant, excellent piezoelectric, and ferroelectric properties, so the dielectric constant and structural adjustability of the modified polyamic acid are improved. Meanwhile, the processes of the preparation method of the modified polyamic acid are simple and easy to operate. Also, the composite film made of the modified polyimide has high storage capacity and excellent flexibility.

In the above, the present application has been described in the above preferred embodiments, but the preferred embodiments are not intended to limit the scope of the invention, and a person skilled in the art may make various modifications without departing from the spirit and scope of the application. The scope of the present application is determined by claims.

What is claimed is:

1. A preparation method of a modified polyamic acid, comprising:
dissolving a first compound and a second compound using a dissolving agent, mixing a dissolved first compound and a dissolved second compound in a reaction vessel, wherein the dissolved first compound and the dissolved second compound are sufficiently reacted to obtain a reaction solution, the first compound has a structure formula as follows:

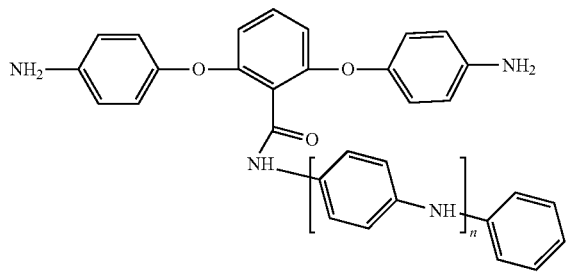

wherein n is a positive integer greater than 1, and the second compound comprises a dianhydride group;
filtering the reaction solution in a vacuum environment to obtain the polyamic acid; and
providing polyvinylidene fluoride, mixing the polyvinylidene fluoride and the polyamic acid to obtain the modified polyamic acid;
wherein the modified polyamic acid comprises 40%-95% by mass of the polyamic acid and 5%-60% by mass of the polyvinylidene fluoride.

2. The preparation method according to claim 1, wherein a molar ratio of the first compound to the second compound ranges from 1:0.7 to 1:1.

3. The preparation method according to claim 1, wherein the second compound comprises one of the following structure formulas:

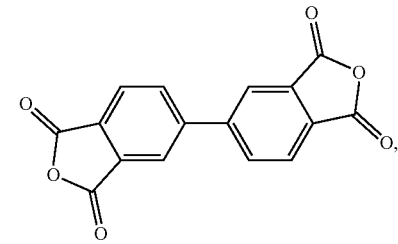

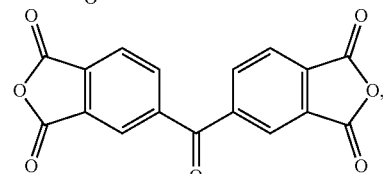

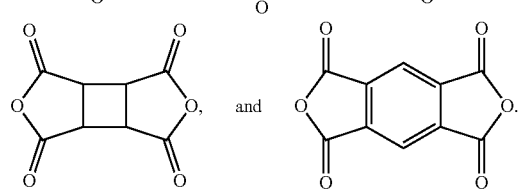

4. The preparation method according to claim 1, wherein the dissolving agent is a mixture of N,N-dimethylhexanamide and N-methylpyrrolidone, and a volume ratio of the N,N-dimethylhexanamide to the N-methylpyrrolidone ranges from 1:0.5 to 1:5.

5. The preparation method according to claim 1, wherein a mixing step of the polyvinylidene fluoride and the polyamic acid comprises:
dissolving the polyvinylidene fluoride using a dissolving agent and mixing a dissolved polyvinylidene fluoride and the polyamic acid through a mechanical blending method to obtain the modified polyamic acid.

6. A preparation method of a composite film, comprising:
providing the modified polyamic acid prepared by the preparation method as claimed in claim 1; and
coating the modified polyamic acid, drying, and crosslinking curing a coated modified polyamic acid to obtain the composite film.

7. A display device, comprising a substrate, wherein the substrate comprises the modified polyamic acid prepared by the preparation method as claimed in claim 1.

* * * * *